Figure 1:
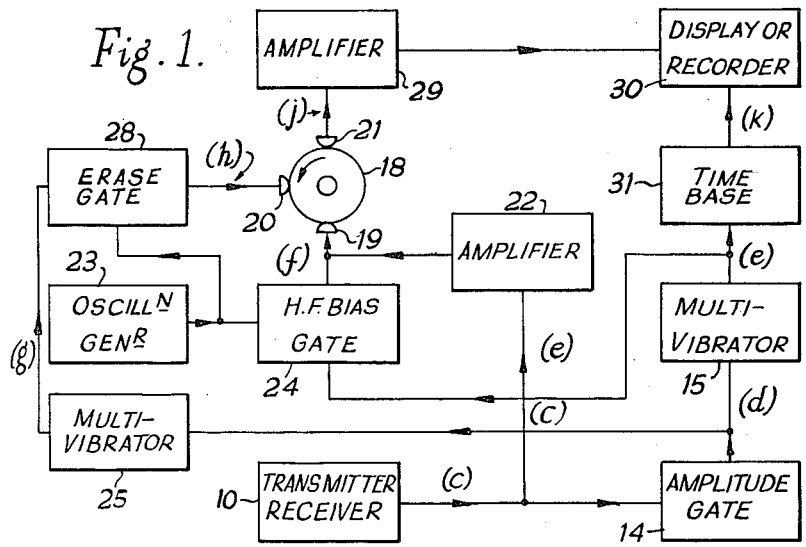

Jan. 30, 1962   R. W. G. HASLETT ET AL   3,019,411
ECHO DETECTION WITH DELAYED READ OUT
Filed Jan. 21, 1958   2 Sheets-Sheet 1

INVENTORS
R. W. G. HASLETT,
P. R. HOPKIN &
BY N. H. BENNING
Moore & Hall
ATTORNEYS United States Patent Office 3,019,411
Patented Jan. 30, 1962

3,019,411
ECHO DETECTION WITH DELAYED READ OUT
Roy William George Haslett, Peter Roy Hopkin, and Norman Henry Benning, all of Barkingside, England, assignors to Kelvin & Hughes Limited, Glasgow, Scotland, a British company
Filed Jan. 21, 1958, Ser. No. 710,291
Claims priority, application Great Britain Jan. 24, 1957
7 Claims. (Cl. 340—1)

The present invention relates to echo-ranging and the like, that is to say systems in which pulses or bursts of waves are emitted from a transmitter, some of the wave energy is reflected as echo signals from objects in their path back to a receiver and the received echo signals are displayed or recorded upon a time base. Examples of such systems are echo-sounding in water, flaw detection in solid bodies to be tested, and radar. The invention is an improvement in or modification of the invention claimed in patent application Ser. No. 560,820, filed January 23, 1956.

According to the invention of this earlier application there is provided echo-ranging or like equipment for displaying or recording echo signals from a predetermined range of distances from a wave transmitter, the equipment comprising a display or recording device, means for triggering a time base of the display (such as a cathode ray tube) or recording device under the control of an echo signal from a region at the further limit of or beyond the said range, means for delaying received echo signals from within the said range by a time equal to or greater than twice the time of travel of the wave between the extremity of the said range nearer the transmitter and the said region, and means for applying the delayed signals to the display or recording device.

In the case of echo sounding, the said region may be the sea bottom and the invention is of special value when the predetermined range is near the sea bottom. Since, when using that invention, a bottom echo serves to control the triggering of the time-base, and since the delay of the received signals applied to the tube is fixed, the position on the screen of the cathode ray tube of the bottom echo remains fixed.

In the case of flaw detection the said region may be the rear surface of the body under test, that is the surface opposite to that into which the waves are injected and through which they are received after reflection. In radar, the said region may for example be the coastline when the equipment is being operated from aircraft or at sea.

The pulses may be emitted at regular or irregular intervals and the intervals may be wholly random throughout or may be in recurrent, like groups, the intervals within each group varying in a random or regular manner.

According to a further feature of the earlier invention, the time base is arranged, between successive transmissions, to execute a plurality of sweeps and to display or record the same echo signals, suitably delayed, during each of these sweeps. In this way, instead of only one picture being presented during each interval between transmitted pulses, a considerable number of like pictures can be presented, thereby reducing fatigue of the operator and increasing the time during which echoes can be studied.

In the embodiments described in the earlier specification, use is made, both for delaying the received echo signals and also for reproducing the signals a plurality of times in each pulse recurrence period (that is a time interval equal to that between successive transmitted pulses), of a magnetic recorder by which the echo signals received as a result of each transmitted pulse are recorded and reproduced.

Such a magnetic recorder requires in addition to the recording and reproducing heads, an erase head by means of which recorded signals are erased and the recorder put in condition to record a fresh set of signals. It is necessary to space the recording and reproducing heads sufficiently to avoid undesired coupling between these heads, and it is physically impossible to make the erase and recording heads co-incident in position owing to their size, and since the recorded matter must be erased before new matter is recorded.

As described in the earlier specification, an erase and bias oscillator generates an oscillation which is applied on the one hand to the erase head to erase recorded matter and on the other hand to the recording head to bias this head into its operative condition. Thus the erasure and the commencement of recording occur simultaneously. Owing to the spacing between the erase and recording heads along the recording track, which may be on a drum, disk or endless tape, the erased track will take a time $t_1$ to reach the recording head, where $t_1$ is the linear speed of the track divided by the linear distance along the track between the erase and recording heads. This time may in practice be about 5 mseconds.

Now, for the purpose of reproducing the echo signals a plurality of times in each pulse recurrence period, the recording medium, which will for convenience in description be considered to be a drum, is arranged to make several rotations between the reception of echoes from successive transmitted pulses. Moreover the erase and bias oscillation is applied to the erase and recording heads simultaneously for a period of say 25 mseconds in each transmitted pulse recurrence period. The result is that a new recording is made over the previous recording on that part of the track which extends between the erase and recording heads at the moment when the erase and bias oscillation is applied. This double recording therefore takes place for a time $t_1$ in each pulse recurrence period. Similarly at the end of each recording interval a further portion of track corresponding to a time $t_1$ is wasted because the recording head is rendered inoperative at a time when this portion of track which has been erased has still to pass the recording head.

If the time $t_1$ is 5 mseconds and if the whole drum periphery represents 20 mseconds, as in the examples given in the earlier specification, the total time wasted is 10 mseconds which represents half the total recording space. The number of possible repetitions of the echo signals in each pulse recurrence period is thus reduced.

Even when the recorded signals are reproduced only once there is a loss of recording space for the same reason.

One of the objects of the present invention is to avoid this disadvantage.

According to a feature of the invention there is provided an echo ranging or like apparatus wherein received echo signals are delayed in time before they are displayed or recorded, wherein the echo signals are delayed with the aid of recording means including a recording medium co-operating with and moving relatively to a recording head, a reproducing head and an erase head, the erase head being adapted to erase previously recorded matter, and wherein the recording and erase heads are rendered operative by means of switching signals of such relative phase that the erase head is rendered operative at a time before the recording head is rendered operative, approximately equal to the time of travel of the medium from the erase to the recording head or to the time between traversals of a given point on the medium by the erase and recording heads.

Although the recording apparatus is conveniently a magnetic recording apparatus it is not necessarily so. It can be of any kind such that signals can be recorded and reproduced from a moving medium and erased. Alternatively, the recording medium may be stationary and the heads may move.

Where reference is made to the transmitter pulse recurrence period it will be appreciated that when the pulses are at irregular intervals this period will vary.

Figure 2:
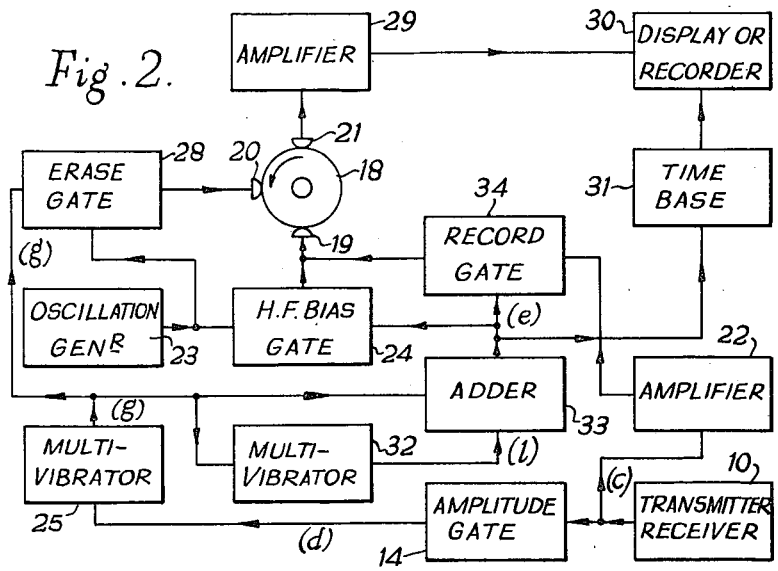
Figure 3:
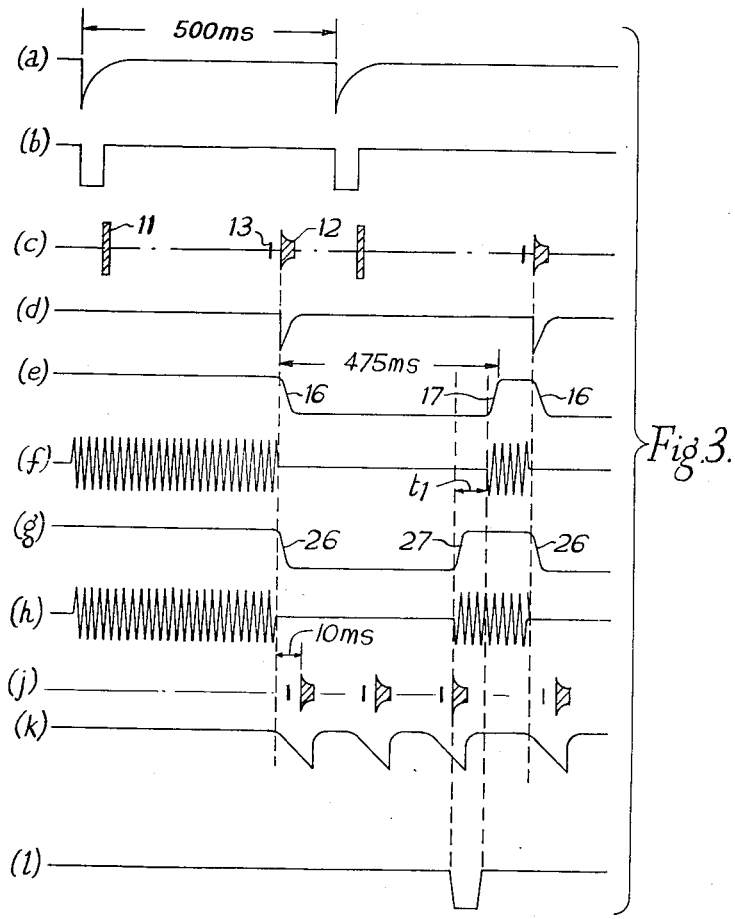

The invention will be described, by way of example, with reference to the accompanying drawings in which FIG. 1 is a block circuit diagram of one embodiment of the invention, FIG. 2 is a block circuit diagram of a modification of the embodiment in FIG. 1, and FIG. 3 shows waveforms present at various points in the circuits of FIGS. 1 and 2.

In FIG. 3 each of the waveforms is designated by a small letter and this letter appears in FIGS. 1 and 2 at the point where that waveform occurs.

Referring to FIG. 1, the transmitter portion of a transmitter-receiver 10, which is not shown in detail in FIG. 1 but which may be as described in the earlier specification hereinbefore referred to, generates pulses $a$ assumed to have a recurrence period of 500 ms. and converts these to the broader pulses $b$. The trailing edges of the pulses $b$ serve to trigger a transmission pulse generator which generates a burst of oscillations of suitable frequency at each triggering, and these bursts are applied to a transmitting transducer. The receiving portion of the component 10 has a transducer which receives echoes and produces an echo signal output $c$. This waveform, as shown, comprises a break-through 11 of the transmitted pulse, an echo 12 from the sea bottom and an echo 13 from fish.

The bottom echo is selected by an amplitude gate 14 capable of passing only signals exceeding a predetermined amplitude and the output $d$ of this gate is fed to a multivibrator 15 and triggers it to generate the waveform $e$. The multivibrator 15 is so constituted that when triggered it generates a negative-going edge 16 and then remains unresponsive to any further triggering until a predetermined time has elapsed, in this example assumed to be 475 ms., when it produces the positive-going edge 17. It is then in a condition to respond to a further triggering pulse of the waveform $d$.

The circuit comprises a recording means in this example assumed to be a magnetic drum 18 rotated at a uniform speed in the direction of the arrow and having a recording head 19, an erase head 20 and a reproducing head 21. The waveform $c$ is applied from the receiver in 10 to an amplifier 22 whose output is coupled to the recording head 19. However, recording of these signals takes place (apart from relatively inefficient recording to be referred to hereinafter) only when, at the same time, a high frequency bias is applied to the head. This bias is generated by an oscillation generator 23 generating a continuous oscillation coupled to a bias gate 24. This gate is arranged to be opened to permit the bias to pass to the recording head 19 when the waveform $e$ from the multivibrator 15 is positive. Thus the bias applied to the recording head 19 is as shown at $f$. It should be mentioned that the breakthrough pulse 11 in FIG. 3 $c$ is assumed to be the first pulse and it is for this reason that the high frequency oscillation is shown in FIG. 3 $f$ as continuing until the bottom echo 12 is received.

A further multivibrator 25 is provided and this is also triggered by the waveform $d$ from the amplitude gate 14 and generates the waveform $g$. Thus, when triggered, the multivibrator 25 generates a negative-going edge 26 and remains unresponsive to any further triggering until a predetermined time later when the positive-going edge 27 occurs. In this example the time is 475−$t_1$ ms.

The waveform $g$ is applied to an erase gate 28 to open this gate when the waveform $g$ is positive to allow erase oscillations to be fed from the oscillation generator 23 to the erase head 20 as shown by waveform $h$.

The reproducing head 21 picks up the recorded signals with a time delay (assumed in this example to be 10 ms.) determined by the speed of the drum 18 and the distance between the heads 19 and 21. Thus the recorded fish echo signals 13 are reproduced 10 ms. after they have been recorded and are followed by the bottom echo signal 12 which has been recorded at the recording head 19 immediately before the negative-going edge 16 of the waveform $e$ switched off the recording bias to that head and is reproduced 10 ms. later at the reproducing head. Thereafter the fish and bottom echo signals are reproduced once in every revolution of the drum, that is to say with a recurrence period of 20 ms. The resulting signals from the reproducing head 21, which are represented diagrammatically by the waveform $j$ in FIGURE 3, are amplified at 29 and fed to a display device or recorder 30.

A time base 31 for the device 30 is switched by the waveform $e$ from the multivibrator 15 and, when triggered, generates a series of sweeps, as shown in FIG. 3 $k$, until stopped by the positive going edge of the waveform $e$. On each of these sweeps one cycle of signals reproduced by the reproducing head 21 is displayed, as indicated by the relationship in time between the waveforms $j$ and $k$ of FIG. 3.

By the use of the invention it is possible to avoid recording upon any unerased part of the medium. The repeating scan may also be carried out at a higher rate than with the apparatus described in the earlier specification. By arranging, in a manner that will be understood by those skilled in the art, that the negative-going edges 26 of the waveform $g$ occur at a time $t_1$ before that shown, it can be arranged that the whole periphery of the drum is used for recording the received echo signal. Some advantage is gained if the edges 26 of waveform $g$ occur at any time $t_1$ or less earlier than the edge 16 of waveform $e$.

It has been found that when the bias oscillation is cut off from the recording head, recording still continues although at a reduced intensity. The full usefulness of apparatus providing for a plurality of reproductions of each set of recorded signals is dependent upon complete cessation of recording during reproduction.

According to a further feature of the present invention, therefore, in echo-sounding or like apapratus in which received echo signals are recorded upon a recording medium moving relatively to recording and reproducing heads and are reproduced a plurality of times before erasure, a gate is provided between the receiver of echo signals and the recording head and means are provided for applying a gating signal to open the gate only at times when recording is required. The gating signal is arranged to be in step with the switching of the bias oscillation on to the recording head and may be derived by rectifying the bias oscillation.

A circuit by which this feature of the invention can be put into practice is shown in FIG. 2. This figure also shows a modified arrangement for gating the biasing and erasing oscillations. Like components in FIGS. 1 and 2 have the same reference.

In FIG. 2, the multivibrator 25 generates the waveform $g$, as in FIG. 1, and this controls the erase gate 28. A multivibrator 32 is arranged to be triggered by the positive-going edge 27 of the waveform $g$ and, so triggered, to generate a negative-going pulse of duration $t_1$ as shown in FIG. 3 $l$. This pulse is added in an adder 33 to the waveform $g$ to produce the waveform $e$ which is fed to the bias gate 24 and to trigger the time base 31.

The waveform $e$ is also fed to a record gate 34 to open this gate when the waveform is positive. Thus the signals from the amplifier 22 are prevented from reaching the recording head 19 excepting when the waveform $e$ is positive.

The use of the multivibrator 32 generating the waveform $l$ and adding this waveform to the waveform $g$ to produce the waveform $e$ has the advantage over the arrangement of FIG. 1 that any instability in the multivibrators produces less change in the duration of the negative-going pulse of waveform $e$.

It will be evident that a like result can be achieved by generating the waveform $e$ with one multivibrator and subtracting the waveform $l$ from the waveform $e$ in order to generate the waveform $g$.

We claim:

1. Echo ranging apparatus comprising receiver means for receiving echo signals, signal display means, a delay device comprising recording, reproducing and erase heads coupled between said receiver means and said display means, said device comprising a recording medium mounted for movement relative to and co-operating with said recording, reproducing and erase heads, and actuating means rendering said erase head operative prior to actuation of said recording head.

2. Apparatus according to claim 1 wherein said actuating means comprise a source of oscillations, separate gating means coupled between said source and said erase and recording heads, two gating signal generating means and means coupling each of said gating signal generating means to a different one of said gating means.

3. Echo ranging apparatus comprising receiver means for receiving echo signals, signal display means, signal recording means comprising a recording head coupled to said receiver means, a reproducing head coupled to said display means, an erase head, and a recording medium mounted in co-operating relation with and movable recurrently relatively to said heads to traverse a given point on said medium a plurality of times, means for actuating said erase head recurrently after a plurality of traversals of a point on said medium past said erase head, a gating device coupled between said receiver means and said recording head, gating signal generating means coupled to said gating device and opening said gate recurrently for a time not exceeding that between two successive ones of said traversals, whereby the relative switching times of said erase and recording heads are such that said erase head is actuated prior to the actuating of said recording head.

4. Echo ranging apparatus comprising receiver means for receiving echo signals, signal display means, a recording medium, a recording head coupled to said receiver means and arranged to record echo signals on said medium, a reproducing head coupled to said display means and arranged to pick up signals from said medium, an erase head for erasing signals recorded on said medium, means for producing relative motion between said medium and said heads whereby a point on said medium travels successively past said erase head, said recording head, and said reproducing head, first actuating means for rendering said recording head operative, second actuating means for rendering said erase head operative, and control means for operating said second actuating means at a time before said first actuating means.

5. Apparatus as claimed in claim 4 in which the recording medium is a magnetic recording medium, the apparatus including a source of oscillations coupled by said first actuating means to said recording head and by said second actuating means to said erase head, and said control means comprising a separate operating signal generator for each of said actuating means.

6. Apparatus as claimed in claim 5 including amplitude gating means coupled between said receiver means in said control means to provide an initiating signal for each operating signal generator.

7. Echo ranging apparatus comprising receiver means for receiving echo signals, signal display means, a magnetic recording medium, a recording head arranged to record echo signals on the recording medium, gating means coupling the receiver means to the recording head, a reproducing head coupled to the display means and arranged to pick up signals from the recording medium, an erase head for erasing signals recorded on the recording medium, means for producing relative motion between said medium and said heads whereby a point on said medium travels successively past said erase head, said recording head, and said reproducing head, an oscillation generator, first actuating means for connecting the oscillation generator to the erase head, second actuating means for connecting the oscillation generator to the recording head to apply a recording bias thereto, and control means for operating said first actuating means and, at a predetermined time interval thereafter, operating said second actuating means and said gating means.

References Cited in the file of this patent

UNITED STATES PATENTS

| | | |
|---|---|---|
| 2,418,136 | Munson | Apr. 1, 1947 |
| 2,729,803 | Harrison | Jan. 3, 1956 |